United States Patent
Sei

(10) Patent No.: US 6,757,954 B2
(45) Date of Patent: Jul. 6, 2004

(54) METHOD FOR MANUFACTURING COLORED PLASTIC CUTTING BOARD WITH ANTI-BACTERIA EFFECT

(76) Inventor: Cheng-Cher Sei, 235 Chung-Ho Box 8-24, Taipei (TW)

( * ) Notice: Subject to any disclaimer, the term of this patent is extended or adjusted under 35 U.S.C. 154(b) by 11 days.

(21) Appl. No.: 10/199,836

(22) Filed: Jul. 22, 2002

(65) Prior Publication Data

US 2004/0010901 A1 Jan. 22, 2004

(51) Int. Cl.⁷ .............................................. A47J 47/00
(52) U.S. Cl. ........................ 29/412; 29/458; 269/289 R
(58) Field of Search .......................... 29/412, 430, 458, 29/779; 269/285, 289 R; 83/13, 55

(56) References Cited

U.S. PATENT DOCUMENTS

| | | | |
|---|---|---|---|
| 5,085,416 A | * 2/1992 | Miyake et al. | ........... 269/289 R |
| 5,354,409 A | * 10/1994 | Gotz | ........................... 156/552 |
| 5,984,294 A | * 11/1999 | Bogomolny | ............ 269/289 R |

FOREIGN PATENT DOCUMENTS

| | | | | |
|---|---|---|---|---|
| JP | 06090865 A | * | 4/1994 | ............ A47J/47/00 |
| JP | 10276918 A | * | 10/1998 | ............ A47J/47/00 |
| JP | 2001071385 A | * | 3/2001 | ........... B29C/65/40 |
| TW | 350304 | | 4/1998 | |
| TW | 362469 | | 12/1998 | |

* cited by examiner

Primary Examiner—David P. Bryant
Assistant Examiner—Jermie E. Cozart

(57) ABSTRACT

A method for manufacturing a colored plastic cutting board with anti-bacteria effect is disclosed. A pressing machine has material suppliers for supplying plastic material from an opening. The lower anti-bacteria layer and the middle supporting plate are outputted from an output. The lower anti-bacteria layer and the middle supporting plate are placed upon a substrate. Then they are transferred to be under a roller; and then a printing film is coated upon a top surface of the middle supporting plate. The printing film is printed with pattern. Then the cutting board is transferred to another pressing device which feeds a top transparent protecting layer upon the printing film. Then, the substrate is sent to a punching device for being punched so as to form a cutting board which has a fixed shape. Thereby, the process of printing and anti-bacteria can be performed continuously.

3 Claims, 3 Drawing Sheets

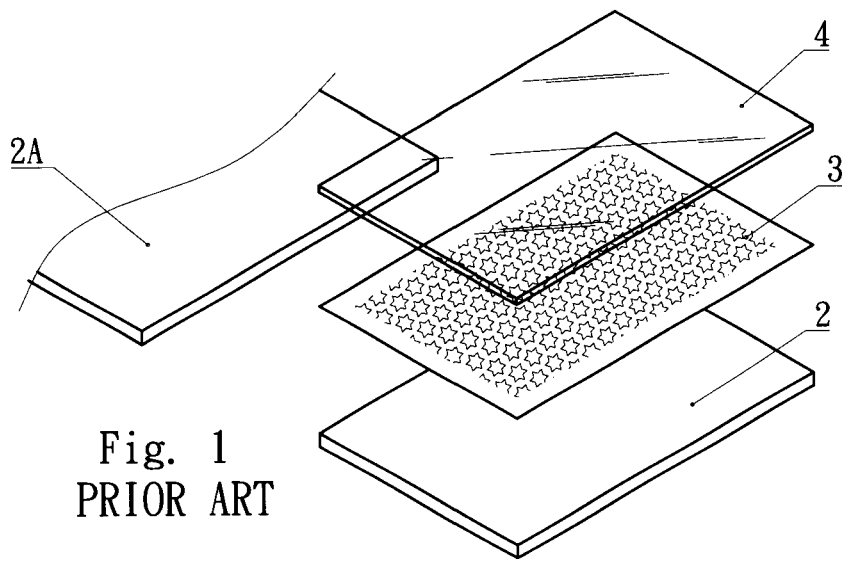
Fig. 1
PRIOR ART
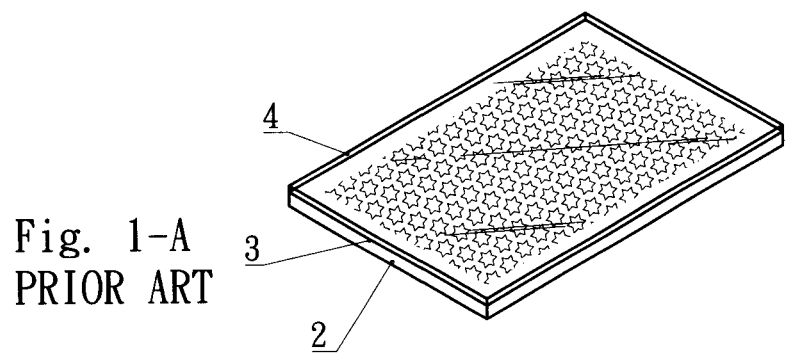
Fig. 1-A
PRIOR ART
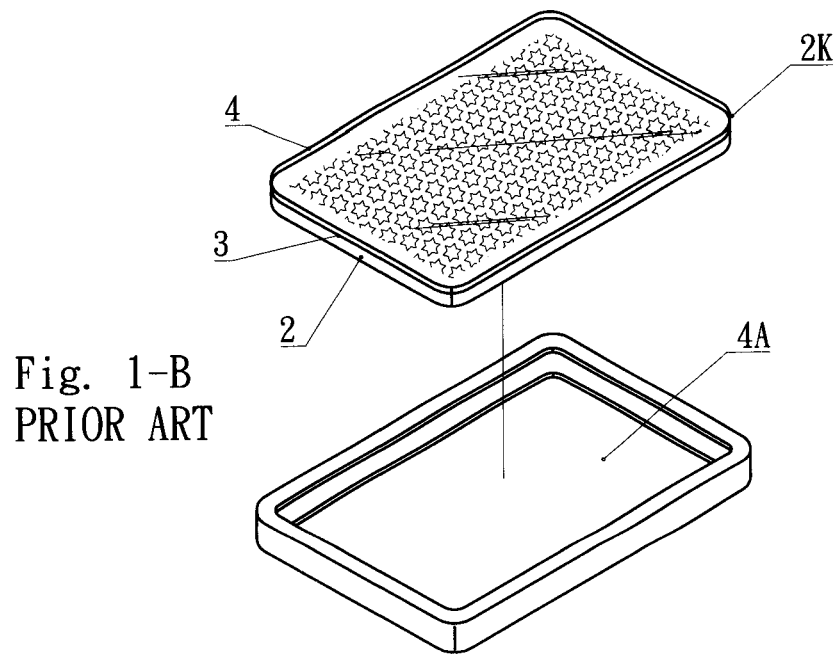
Fig. 1-B
PRIOR ART

METHOD FOR MANUFACTURING COLORED PLASTIC CUTTING BOARD WITH ANTI-BACTERIA EFFECT

FIELD OF THE INVENTION

The present invention relates to cutting boards, and particularly to a method for manufacturing a colored plastic cutting board with anti-bacteria effect.

BACKGROUND OF THE INVENTION

The cutting boards are frequently used in the daily life. In the prior art, the cutting board is made of woods. However, wood is more and more expensive and has the defects of being easily polluted and difficult to be cleaned. The bacteria easily breed in the cutting board. Therefore, plastic made cutting boards are developed.

The conventional plastic cutting board is coated with a single light color so that it can be polluted easily, and moreover, the function of anti-bacteria is not preferred. To improve these defects, other plastic cutting boards are colored and are performed with anti-bacteria process, such as those disclosed in Taiwan Patent No. 350304 "Cutting Board with Improved Structure" and No. 362469, "Cutting Board with Enhancing Glass", etc.

These improved prior arts have the effect of beautiful outlook, anti-bacteria, etc. Referring to FIGS. 1, 1A and 1B, in manufacturing, a long plate 2A formed by pressing is cut into various substrate 2. Then the top of the substrate 2 is printed with color patterns 3. Then, a transparent top plate 4 covers the patterns so as to prevent from damage by cutting. Then the corners 2K are ground. Then, four edges of the cutting board are added with a supporting seat 4A and then a protecting frame is added. However, the process is complicated and the thus the manufacturing speed is low, and cost is high.

The reason for adding the supporting seat 4A is that the pattern 3 is possibly separated from the top plate 4 or substrate 2, thereby, causing the inks on the pattern 3 will pollute foods.

In general, the anti-bacteria process is done on the material of the long plate 2A. That anti-bacterial plastics is used to be shaped, but this will induce the increment of the material cost. In fact, only the bottom of the cutting board contacting the table surface is necessary to execute anti-bacteria process.

SUMMARY OF THE INVENTION

Accordingly, the primary object of the present invention is to provide a method for manufacturing a colored plastic cutting board with anti-bacteria effect, wherein a plastic plate with a predetermined width is formed by a plastic punching machine. Then the plastic plate is enclosed by a lower anti-bacteria layer, a middle supporting plate, a printing layer and a top transparent protecting layer.

A pressing machine has material suppliers for supplying plastic material from an opening. The lower anti-bacteria layer and the middle supporting plate are outputted from an output. The lower anti-bacteria layer and the middle supporting plate are placed upon a substrate. Then they are transferred to be under a roller; and then a printing film is coated upon a top surface of the middle supporting plate. The printing film is printed with pattern. The width of the pattern 6A is slightly smaller than a width of the middle supporting plate. Then the cutting board is transferred to another pressing device which feeds a top transparent protecting layer upon the printing film. The top transparent protecting layer has a width equal to that of the middle supporting plate.

Then, the substrate is sent to a punching device for being punched so as to form cutting board which have a fixed shape. Thereby, the process of printing and anti-bacteria can be performed continuously.

BRIEF DESCRIPTION OF THE DRAWINGS

FIG. 1 is an exploded perspective view of a prior art cutting board.

FIG. 1A is an assembled view of FIG. 1.

FIG. 1B is a complete view of FIG. 1A.

FIG. 2A is a partial enlarged view of the product of the present invention.

FIG. 2B is a cross sectional view of the product of the present invention.

DETAILED DESCRIPTION OF THE PREFERRED EMBODIMENTS

Figure 2:
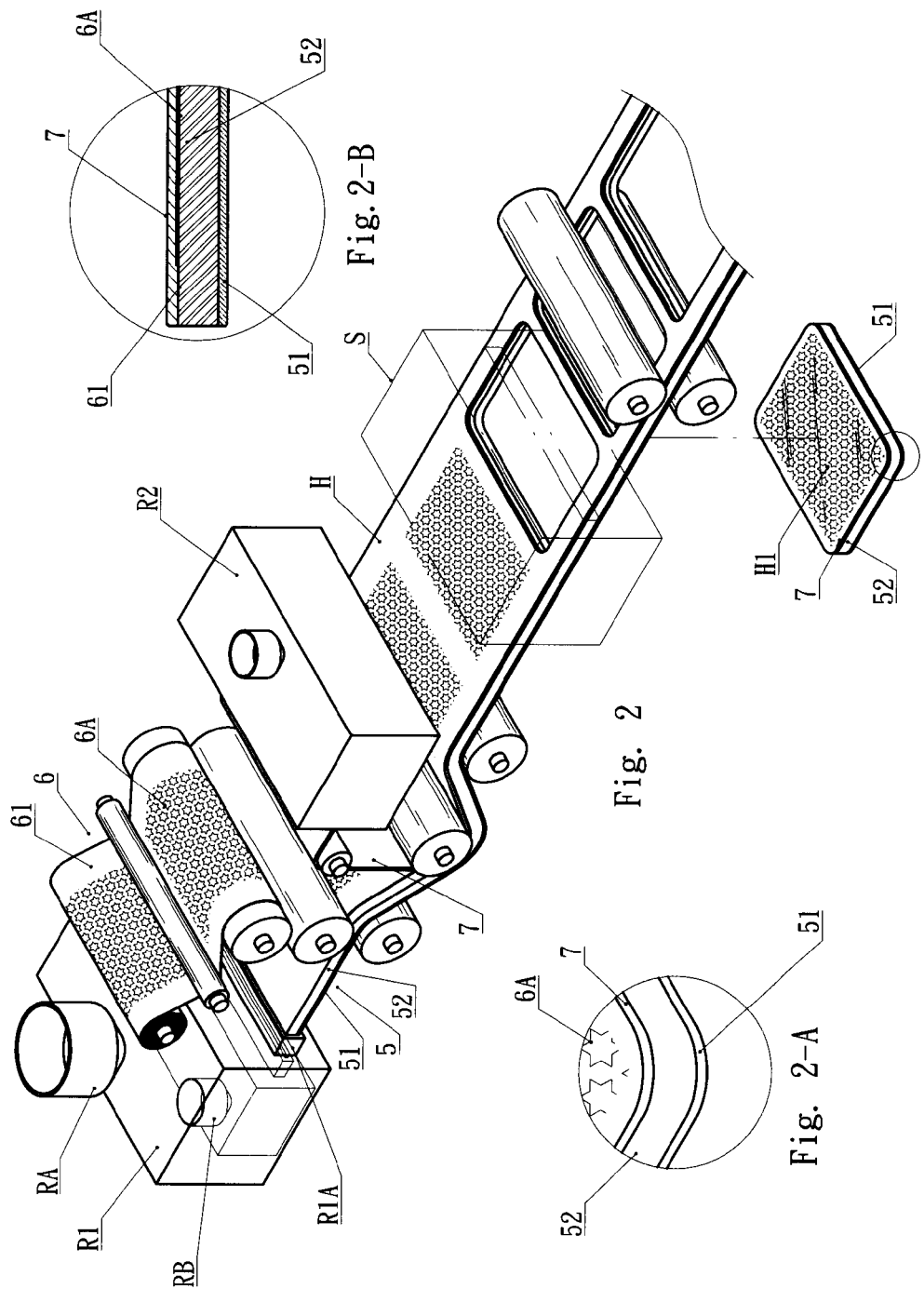
FIG. 2 is a perspective view for describing the manufacturing process of the present invention.
Figure 3:
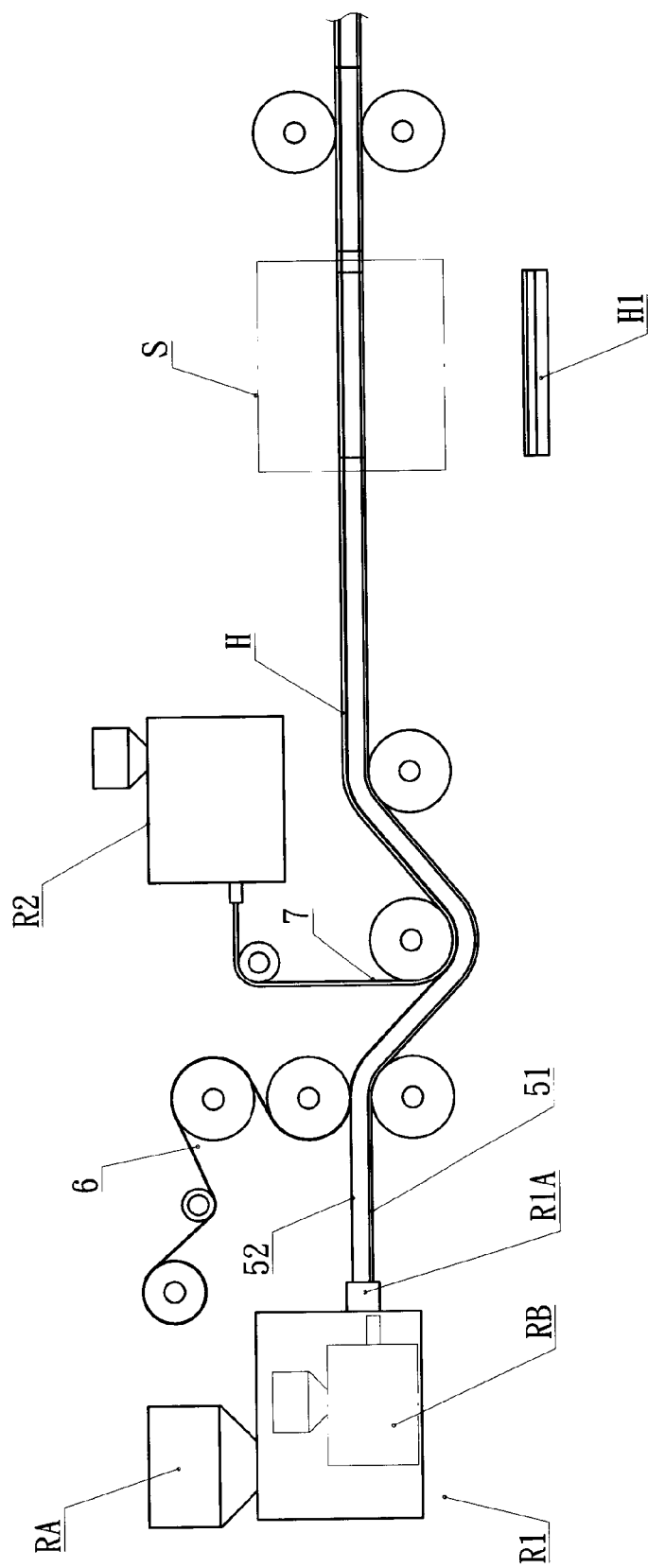
FIG. 3 is a perspective view showing the process of the present invention.

Referring to FIGS. 2 and 3, in the present invention, a plastic plate 5 with a predetermined width is formed by a plastic cutting machine R1. The plastic plate 5 comprises a lower anti-bacteria layer 51, a middle supporting plate 52, a colored layer 6 and a top transparent protecting layer 7 which are formed as a continuous substrate H.

The manufacturing method will be described herein. A cutting machine R1 has material suppliers RA, and RB for supplying plastic material from an opening. The lower anti-bacteria layer 51 and the middle supporting plate 52 are outputted from an output R1A. The lower anti-bacteria layer 51 and the middle supporting plate 52 are placed upon a substrate H. Then they are transferred to be under a roller; and then a printing film 61 is coated upon a top surface of the middle supporting plate 52. The printing film is printed with pattern 6A; and the width of the pattern 6A is slightly smaller than a width of the middle supporting plate 52. Then the cutting board is transferred to another pressing device R2 which feeds a top transparent protecting layer 7 upon the printing film; the top transparent protecting layer 7 has a width equal to that of the middle supporting plate 52.

After the substrate H is provided, it is sent to a punching device S for being punched to form cutting board H1 which have a fixed shape. Thereby, the process of printing and anti-bacteria can be performed continuously.

The advantages of the present invention will be described in the following.

1. The punching device S can punch the object with a fixed size (not shown) so that the size of the product is precise and steady.

Moreover, by setting shapes of the corners of the molding frame, the four round corners can be completed at the same time (referring to FIG. 2A). No further grinding and finishing are required. The cutting board H1 can be manufactured simply and rapidly.

2. Since the pattern 6A on the colored film 61 has a width narrower than the middle supporting plate 52 and are adhered to the inner section of the top surface of the middle supporting plate 52 and the top transparent protecting layer 7 having a width equaling to the middle supporting plate 52 encloses the film, the cutting position is slightly shifted from pattern so that the printing ink of the pattern 6A is completely enclosed within the plastic layer (referring to FIGS. 2A and 2B). Other than no pollution on the thick portion of the cutting board H1, the edge of each plastic layer has a preferred fastness.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for manufacturing a colored plastic cutting board with anti-bacteria effect; characterized in that:

a lower anti-bacteria layer and a middle supporting plate are outputted from an output of a cutting machine which two have material suppliers for supplying plastic material; then the lower anti-bacteria layer and the middle supporting plate are placed upon a substrate; then the substrate with the lower anti-bacteria layer and middle supporting plate are transferred to be under a roller; and then a printing film is coated upon a top surface of the middle supporting plate; the printing film is printed with a pattern; a width of the pattern is slightly smaller than a width of the middle supporting plate; then the substrate is transferred to another pressing device which feeds and presses a top transparent protecting layer upon the printing film; the top transparent protecting layer has a width equal to that of the middle supporting plate; and after the substrate is provided, the substrate is sent to a punching device for being punched to form a cutting board which has a fixed shape.

2. The method for manufacturing a colored plastic cutting board with anti-bacteria effect as claimed in claim 1, wherein four corners of the substrate are punched to have a predetermined shape by setting corners of a mold frame which are used to punch the substrate.

3. The method for manufacturing a colored plastic cutting board with anti-bacteria effect as claimed in claim 1, wherein the printing film is adhered to an inner side of the middle supporting plate at a top surface of the cutting board; the printing film is enclosed by the middle supporting plate and the top transparent protecting layer which has a width equaling to that of the middle supporting plate.

* * * * *